Patented May 21, 1929.

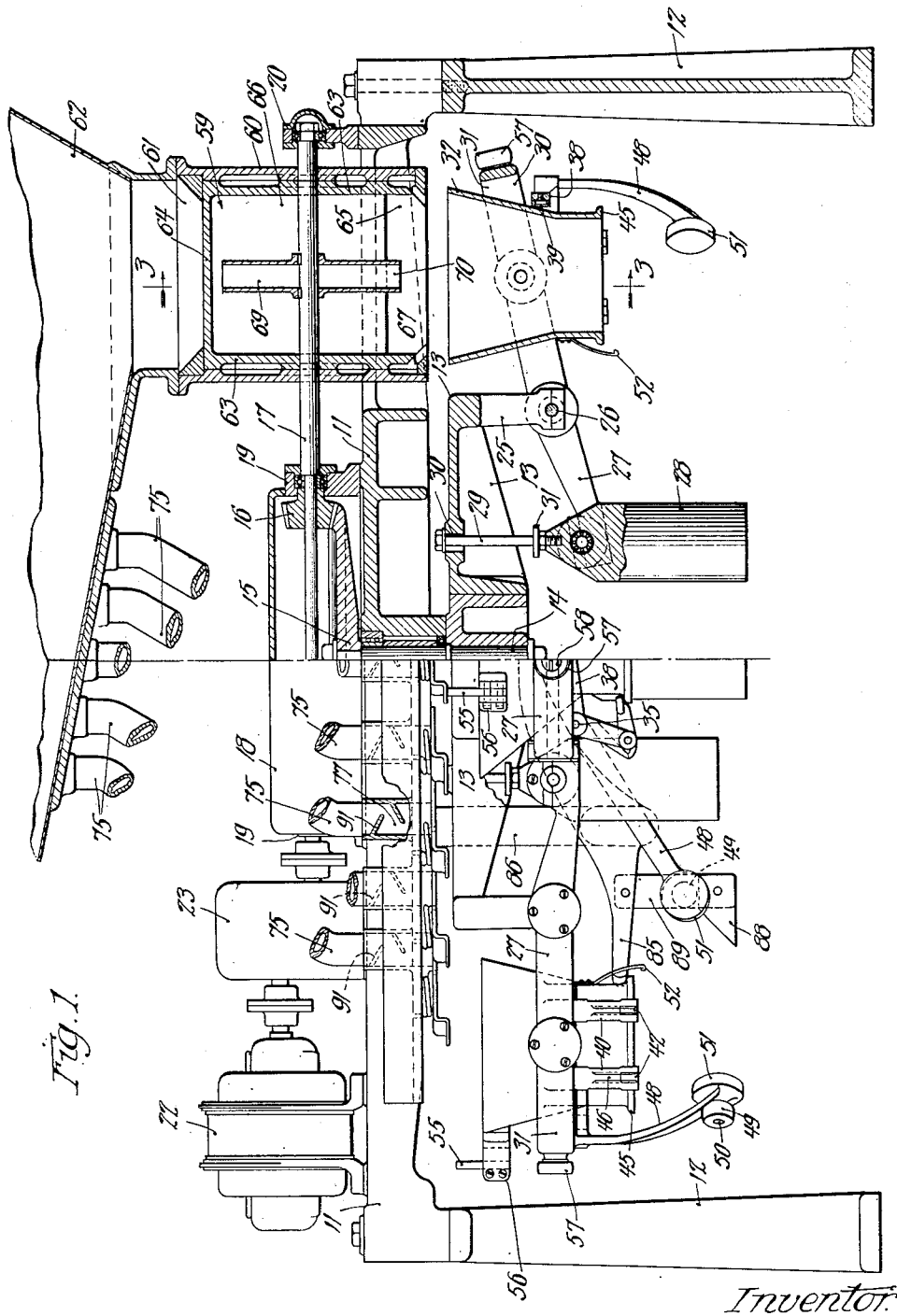

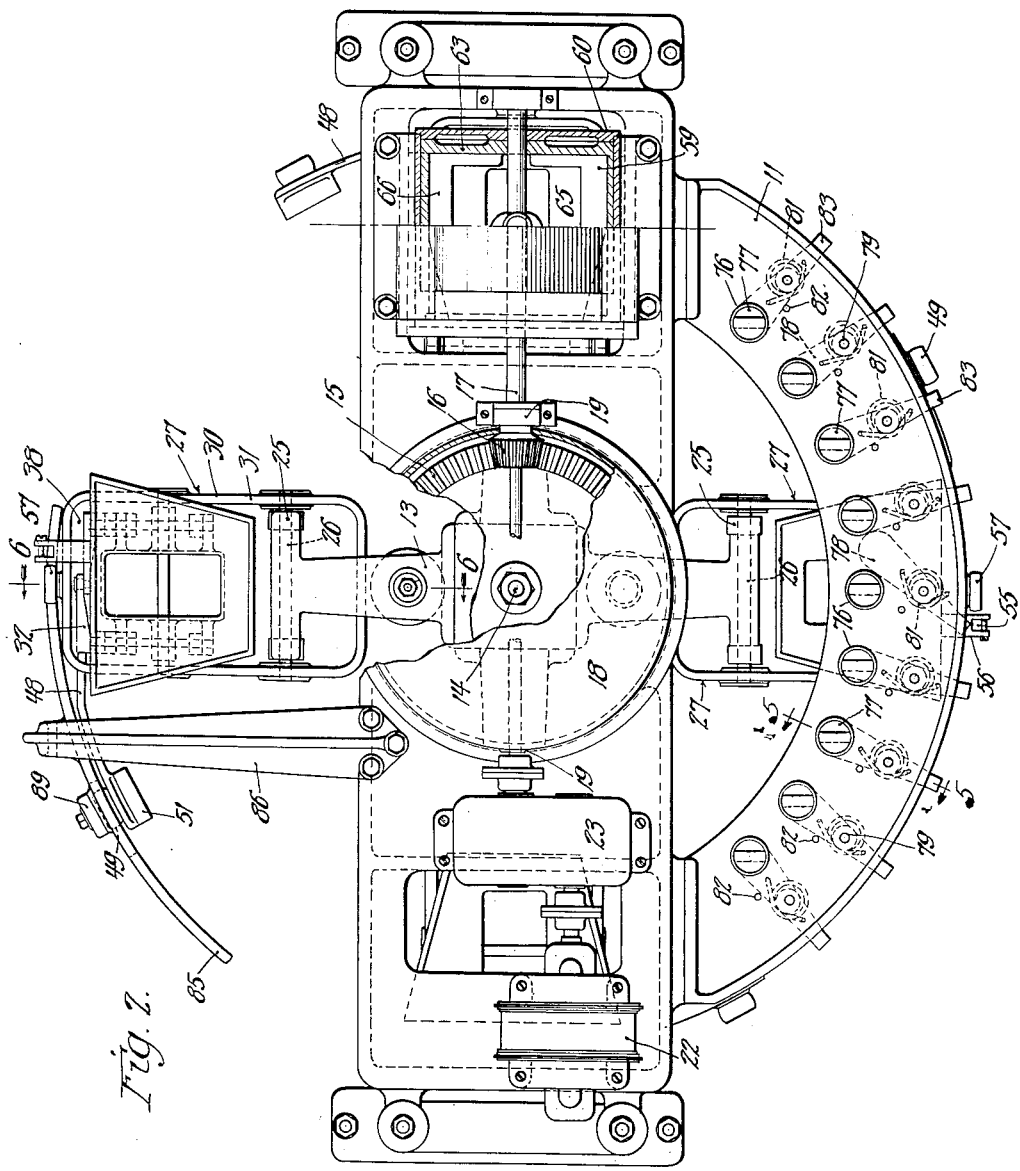

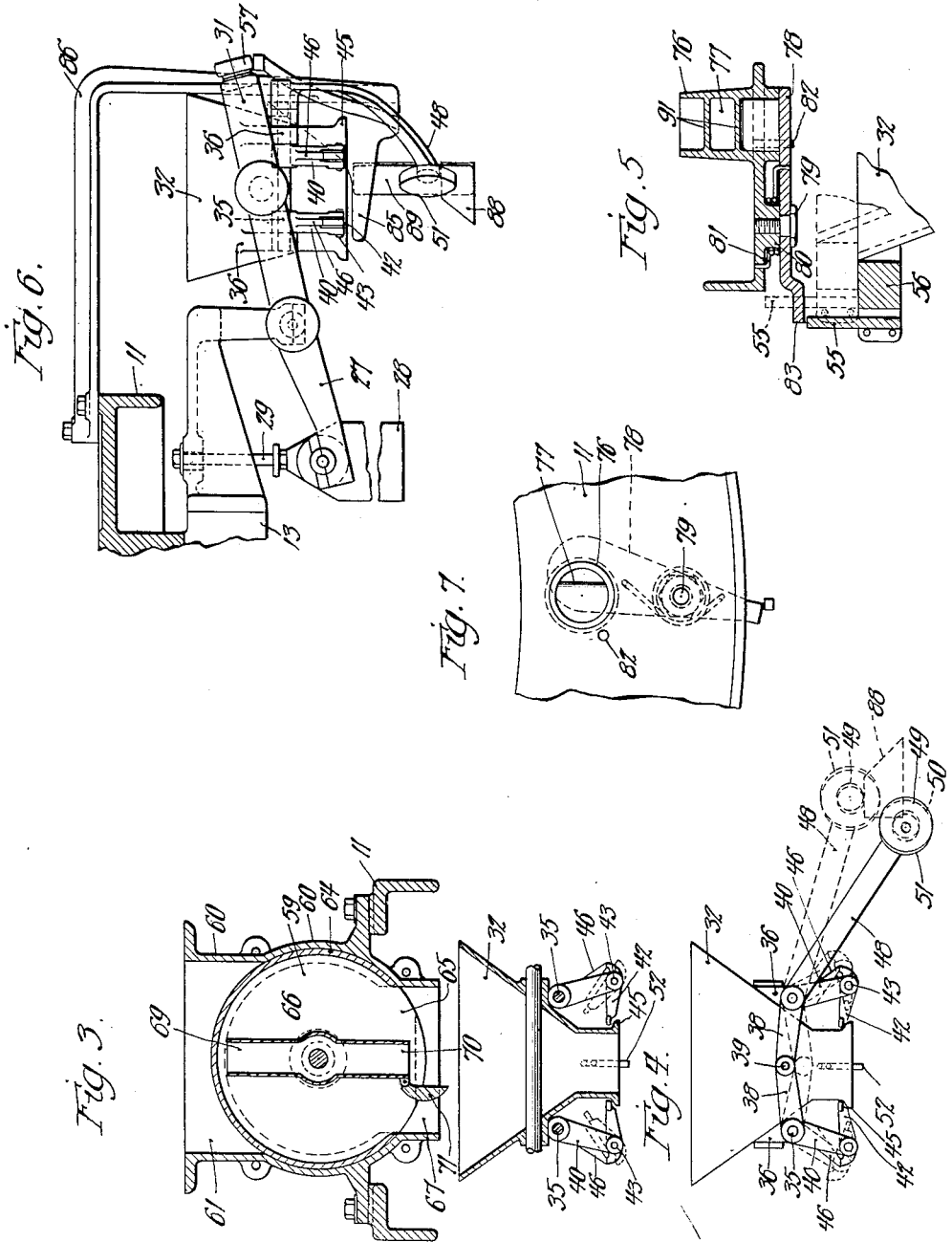

1,713,575

UNITED STATES PATENT OFFICE.

ROGERS M. WARWICK, OF EASTLAKE, FLORIDA.

BAG-FILLING MACHINE.

Application filed September 26, 1921, Serial No. 503,281. Renewed September 13, 1928.

My invention relates to a bag filling machine and more particularly to a bag filling machine having means for feeding into the bags predetermined quantities of material.

The objects of my invention are:

First, to provide a device of the class described comprising weighing mechanism, means for supplying to the weighing mechanism a predetermined volume of material of less weight than a desired total, means for supplying the remainder of the total weight of material desired, and means controlled by the weighing mechanism for controlling the last mentioned means;

Second, to provide a device of the class described comprising weighing mechanism, means for delivering to the weighing mechanism a predetermined volume of material of less weight than a desired total, means for subsequently delivering to the weighing mechanism a plurality of additional charges of material, and means for controlling the weight of each additional charge by the weight of material previously delivered to the weighing mechanism;

Third, to provide a device of the class described comprising weighing mechanism, means for supplying to the weighing mechanism a predetermined volume of material of less weight than a desired total, and means for supplying to the weighing mechanism the remainder of the total weight desired, the latter means comprising means for delivering the total capacity or any fraction thereof of said latter means;

Fourth, to provide a device of the class described comprising weighing mechanism, means for supplying to the weighing mechanism a predetermined volume of material of less weight than a desired total, a series of feed mechanisms for supplying to the weighing mechanism the remainder of the total weight desired, each feed mechanism comprising means for delivering variable amounts of material, and means controlled by the weighing mechanism for controlling the feed mechanisms;

Fifth, to provide a device of the class described comprising a traveling support, weighing mechanism carried thereon, means for supplying a predetermined volume of material of less weight than a desired total, and means controlled by the weighing mechanism for subsequently feeding the weighing mechanism the remainder of the total weight of material desired, the latter means being adapted to supply any fraction of its total capacity;

Sixth, to provide a device of the class described comprising a traveling support, weighing mechanism carried by the support, means for supplying to the weighing mechanism a predetermined volume of material of less weight than a desired total, a plurality of feed mechanisms arranged to come serially into operative relation with the weighing mechanism, each feed mechanism comprising means for delivering variable quantities of material, and means controlled by the weighing mechanism for actuating the feed mechanisms;

Seventh, to provide a device of the class described comprising weighing mechanism, a series of feed devices for supplying material to the weighing mechanism, means controlled by the weighing mechanism for successively actuating the feed devices, each feed device comprising means for delivering variable quantities of material;

Eighth, to provide a device of the class described comprising a traveling support, weighing mechanism having a scale beam pivotally secured to the support to oscillate in a vertical plane, means for delivering to the weighing mechanism a predetermined volume of material less than a desired total, a series of feed mechanisms for successively delivering to the weighing mechanism additional amounts of material, each feed mechanism comprising a valve and means carried by the scale beam for opening the valve variable amounts;

Ninth, to provide a device of the class described comprising a traveling support, weighing mechanism having a scale beam pivotally secured to the support to oscillate in a vertical plane, a series of feed mechanisms for successively delivering variable amounts of material to the weighing mechanism, each feed mechanism having a valve pivotally mounted to move in a substantially horizontal plane, and means carried by the scale beam for opening the valve variable amounts;

Tenth, to provide a bag filling machine comprising weighing mechanism, a series of feed mechanisms for successively delivering variable quantities of material to the weighing mechanism, each feed mechanism comprising a valve and means controlled by the weighing mechanism for opening each of said valves a distance less than the distance the valve of the preceding feed mechanism is opened;

Eleventh, to provide a bag filling machine comprising weighing mechanism for successively delivering variable quantities of material to the weighing mechanism, each feed mechanism comprising a valve, and means controlled by the weighing mechanism for holding each valve open a shorter length of time than the valve of the preceding feed mechanism is held open;

Twelfth, to provide a bag filling machine comprising weighing mechanism, a series of feed mechanisms for successively feeding variable quantities of material to the weighing mechanism, each feed mechanism comprising a valve, and means for opening each valve an amount inversely proportional to the weight of material in the bag;

Thirteenth, to provide a bag filling machine comprising a rotatably journaled carrier, weighing mechanism comprising a scale beam pivotally secured to the carrier, means for detachably securing a bag to the scale beam, and means for automatically releasing the bag from the scale beam;

Fourteenth, to provide a bag filling machine comprising a traveling support, weighing mechanism carried by the support, means for detachably securing a receptacle to the weighing mechanism, means for automatically releasing the receptacle from the weighing mechanism, and means for locking the weighing mechanism in an inoperative position while the receptacle is being released;

Fifteenth, to provide a bag filling machine comprising a traveling support, a scale beam pivotally secured to the support, means for detachably securing a bag to the scale beam, means for automatically releasing the bag from the scale beam, and means for locking the scale beam against angular displacement about its pivotal axis when the bag is being released.

These and other objects of my invention will be more clearly pointed out as the following description progresses, reference being had to the accompanying drawings, wherein—

Figure 1 is a side elevation, partly in section, of a bag filling machine embodying the novel features of my invention;

Figure 2 is a plan elevation of the bag filling machine, certain portions thereof being broken away for the purpose of better illustration;

Figure 3 is a section taken on line 3—3 of Figure 1;

Figure 4 is an isolated end elevation of a funnel, and bag holding means carried by the funnel, the funnel and bag holding means together forming a part of my improved bag filling machine;

Figure 5 is a section taken on line 5—5 of Figure 2, a portion of a funnel being shown in connection therewith to facilitate this description;

Figure 6 is a section taken on line 6—6 of Figure 2;

Figure 7 is an enlarged detail view of a valve which I employ in my improved bag filling machine.

Similar characters of reference indicate similar parts throughout the several views.

The drawings illustrate a bag filling machine embodying the novel features of my invention, the machine having means for filling bags with predetermined quantities of cement, fertilizer, or the like.

Referring to Figure 1, the reference character 10 designates the frame of my improved bag filling machine, the frame 10 comprising a table 11 supported upon a plurality of legs 12—12. Disposed underneath the table 11 is a support or carrier 13 rigidly secured to a vertically disposed shaft 14 which is rotatably journaled in the table 11. A bevel gear 15 rigidly secured to the upper end of the shaft 14 meshes with a bevel gear 16 secured upon a shaft 17. The bevel gears 15 and 16 are enclosed preferably in a housing 18. The housing 18 is provided with a plurality of bearings 19—19 in which the shaft 17 is rotatably journaled, an additional bearing 20 carried by the frame 10 being provided to rotatably journal one end of the shaft 17, which extends to a point near the edge of the table 11. The shaft 17 is driven by means of an electric motor 22 fastened upon the table 11, reduction gearing enclosed in a housing 23 being provided intermediate the motor 22 and shaft 17. It is apparent that the motor 22 when energized will rotate the carrier 13 through the medium of the shaft 17, bevel gears 15 and 16 and the shaft 14.

The carrier 13 is provided with a plurality of pairs of depending arms 25, each pair of which carries a pin 26, the pins 26 being disposed equidistantly from the shaft 14. The ends of each pin 26 serve to pivotally journal a scale beam 27. The scale beams 27 are arranged to oscillate in radial planes relative to the axis of the shaft 14. Pivotally secured to the inner end of each scale beam 27 is a weight 28 which is designed to balance the outer end of the scale beam and a predetermined quantity of material fed into a bag secured to the scale beam. A bolt 29 threaded into each weight 28 projects through one of a plurality of apertures 30 provided in the carrier 13. The head of each bolt 29 serves to limit the downward movement of its associated scale beam 27, and a washer 31 disposed upon the bolt serves to limit the upward movement of the weight 28. This structure limits the oscillations of the scale beam to a range within which the scale beam is adapted to actuate certain feed mechanisms hereinafter described, allowing the scale beam to assume a position wherein the feed mechanisms will not be actuated.

As shown in Figure 2, each scale beam 27 is shaped to provide a loop 30 having side members 31—31. Interposed between the side members 31—31 at the outer end of each scale beam 27 is a funnel 32. The funnel 32 is pivotally secured to the side members 31—31 for a purpose which will presently appear.

Each of the funnels 32 is provided with means for detachably securing a bag to it at its lower end. The means comprise a pair of shafts 35—35 rotatably journaled in bearings 36—36 formed integrally with the funnel 32. Each pair of shafts 35—35 is disposed, one on either side of the associated funnel 32, the axes of the shafts being disposed parallel with one another. The outer end of each shaft 35 has rigidly secured to it a lever 38. The free ends of each pair of levers 38—38 are operatively connected by means of a pin 39 threaded into one of the levers and extending through a slot in the other of the levers, in a manner well known to those skilled in the art. It is readily understood that angular displacement of one of each pair of shafts 35—35 will be accompanied by a like angular displacement of the other shaft, the displacement of the shafts, however, being in opposite directions. Rigidly secured to each shaft 35 and interposed between the bearings 36—36 for that shaft are a plurality of arms 40—40. The lower end of each arm 40 is bifurcated to receive one end of a clamping lever 42 pivotally secured to the arm by means of a pin 43. The free end of each clamping lever 42 is adapted to co-operate with a ledge or bead 45 formed upon the lower end of each funnel 32 to secure a bag to the funnel. It is apparent that a bag may be threaded upon the lower end of each funnel 32 and that the clamping lever 42 will clamp the bag to the funnel, the force exerted upon the bag in a downward direction by the weight of any material disposed in the bag tending to cause the clamping levers to bind the bag more securely to the funnel. When a bag is to be threaded upon the funnel 32, the operator simply grasps the bag and slips it over the bead 45, raising the clamping levers 42 by pushing against them with the bag.

Referring to Figure 3, it will be noted that the downward movement of each clamping lever 42 is limited by means of the stop 46 formed integrally with the arm 42 associated with that clamping lever. The stop 46 prevents the clamping lever 42 from engaging or contacting the surface of the funnel 32, but permits it to come in close proximity to the funnel, the clearance being less than the thickness of the fabric of which the bags are made. The purpose of this structure is to prevent the arms 42 from binding upon the surface of the several funnels, thereby hindering the operator during the threading operation.

Rigidly secured to the following shaft of each pair of shafts 35, the shafts being carried in a clockwise direction about the rotary axis of the carrier 13 (Fig. 2), is a lever 48. A roller 49 is rotatably journaled upon a pin 50 threaded into the free end of each lever 48, the roller 49 providing means whereby the bags may be automatically released from the bag holding mechanism, in a manner presently to be described. The free end of each lever 48 terminates in an enlarged portion 51, the weight of which tends to hold the bag clamping means in a position wherein the arms 42 are in close proximity to the funnel.

As it is necessary to allow the air in the bags to escape when they are being filled, the discharge end of each funnel is of less area than the area of the mouth of the bag. The slack in a bag is taken up by a leaf spring 52 with which each funnel 32 is provided. The operator, when drawing the bag over the discharge end of the funnel, simply passes the mouth of the bag over the leaf spring, permitting it to take up the aforementioned slack before the several arms 42 drop into place and clamp the bag to the funnel. This structure insures an opening through which the air in the bag may easily escape.

A pin 55 is adjustably secured in a bracket 56 fastened upon the upper outer end of each funnel 32, and a roller 57 is rotatably journaled on a pin 58 threaded into each scale beam 27 at its outer end. The functions of the pin 55 and roller 57 will be described hereinafter.

I will now describe the mechanism for successively delivering a predetermined volume of material to each of the bags carried by the funnels 32.

Rigidly secured to the shaft 17 and disposed intermediate the housing 18 and the bearing 20 is a hollow drum 59 suitably housed in a casing 60. The casing 60 is supported by and fastened to the table 11, as shown in Fig. 3, and is provided with a passageway 61 communicating with a hopper 62 disposed above the table 11. The hopper 62 is adapted to hold a comparatively large quantity of the material with which the bags are to be filled, the drum serving to receive and successively deliver predetermined volumes of the material to the funnels as the funnels pass beneath the drum. The drum 59 comprises a plurality of end walls 63—63 and a cylindrical wall 64 provided with an aperture 65 which registers with the passageway 61, once for every revolution of the drum. During that period of time in which the aperture 65 communicates with the passageway 61, the contents of the hopper 62 will move downwardly, completely filling the chamber 66 of the drum. The continued rotation of the drum will bring the aperture to a point directly beneath its rotary axis, there registering with a discharge outlet 67 formed in the casing 60. It is apparent that the driving mechanism for the machine may be so timed as to cause the funnels 32 to pass beneath the discharge opening 67 to successively receive the charges of material delivered by the drum through the discharge outlet 67.

To facilitate the flow of material from the drum 59 when it is delivering a charge to one of the funnels 32, I provide means for admitting air into the drum, thus preventing a partial vacuum from forming inside of the drum. The means comprise a tube 69 rigidly secured to the shaft 17, the tube 69 being disposed within the drum 59. As shown in Figs. 1 and 3, the shaft 17 passes through the tube 69 at a point intermediate its ends, the tube 69 being enlarged at this point to prevent a reduction of the effective area of the passageway extending through it. Both ends of the tube 69 are open and one of the ends designated by the reference character 70 opens into the aperture 65. This end is provided with a valve 71 pivotally secured to the tube 69. When the drum is in the position illustrated in Fig. 3, the weight of the valve 71 will cause it to drop away from the end 70 of the tube 69, thus permitting air to pass into the interior of the drum, and as aforesaid, facilitating the flow of the material being discharged by the drum. However, as the drum 59 rotates, the rotation being in a clockwise direction (Fig. 3), the wall of the casing 60 will serve as a cam and close the valve 71. Therefore, when the aperture 65 is registering with the passageway 61, the end 70 of the tube 69 will be closed by the valve 71, thus preventing the material flowing from the hopper 62 from entering the tube.

After a bag secured to one of the funnels 32 has received a predetermined volume of material from the drum 59, it passes beneath a series of auxiliary feed mechanisms which are arranged to successively deliver additional charges of material into the bag to bring the total weight of material in the bag up to a desired value. It is, of course, understood that the volume of material delivered into the bag by the drum 59 is of less weight than the desired total. Each of the feed mechanisms comprises a tube 75 having its upper end opening into the hopper 62 and its lower end terminating in one of a plurality of apertured bosses 76 formed integrally with the table 11, the aperture in each boss 76 being indicated by the reference character 77. The series of apertures 77 are arranged concentrically relatively to the rotary axis of the carrier 13, and the funnels 32 will pass successively beneath them. The lower end of each aperture 77 is normally closed by a valve 78 pivotally mounted upon a pin 79 threaded into a boss 80, each of which is formed integrally with the table 11. A helical spring 81 is wound around each boss 80 and has one of its ends fastened to the table 11, the other end being fastened to the valve 78, the spring serving to yieldingly hold its associated valve 78 in a position closing the aperture 77. A plurality of stop pins 82 provide means against which the several springs 81 may position the valves 78 when the valves are in closed positions. Each valve 78 is provided with a trip finger 83 normally disposed radially relatively to the rotary axis of the carrier 13.

As hereinbefore described, each funnel 32 is provided with a pin 55. The pins 55 are arranged to engage the trip fingers 83 of the several valves 78 as the fingers 32 pass beneath the valves. If the weight of the material carried in the bags has not reached the desired total, the structure is so arranged that, until the outer end of the scale beam 27 has been lowered sufficiently by the weight of material in the bag to lie in a horizontal plane, the pins 55 will engage the trip fingers 83, thus opening the valves, but will drop below them when the desired total has been attained, causing the scale beam to assume a horizontal position.

As the pins 55 move in planes radially disposed relatively to the rotary axis of the carrier 13, and as the trip fingers 83 move in horizontal planes, it is readily understood that, as the weight of the material in a bag nears the desired total, the pin 55, associated with that bag, will displace or open the successive valves less amounts and for smaller intervals of time. Therefore, the charge delivered by any one of the several auxiliary feed mechanisms will be less than the charge delivered by the preceding auxiliary feed mechanism, thus enabling the weight of the material previously fed into a bag to control the amount of material to be discharged from the feed mechanism from which the bag is receiving the present charge. The structure and method described insure accurate filling of the bags, as the instant a bag has received the total weight of material desired, the pin 55 is disengaged from whichever trip finger 83 it has been operatively engaging.

The means for automatically releasing a filled bag from the bag holding mechanism comprises a cam 85 carried on a bracket 86 which is rigidly secured to the table 11. The cam 85 is arranged to lift the outer end of the scale beam and align it with the bag releasing mechanism after the scale beam has passed beyond the last auxiliary feed mechanism a sufficient distance to permit the contents of the bag to settle. The cam 85 successively engages the aforementioned rollers 57 carried at the outer end of each scale beam 27, bringing the outer end of the scale beam to a position wherein the rollers 49, carried by the levers 48, will engage a cam 88 positioned below the cam 85. The cam 88 is adapted to raise the roller 49, thus displacing its associated shafts 35 and withdrawing the clamping levers 52 from the funnel 32, the bag, of course, simply dropping down upon a platform or any other suitable device.

The cam 85, in addition to its function of positioning the scale beam relatively to the cam 88, also co-operates with the bolts 29 threaded into the weights to lock the scale beam relatively to the cam 85 when the bags are being released,—that is, the scale beams are held against angular displacement about their pivotal axes. The structure is so arranged that the heads of the bolts 29 engage the upper surface of the carrier 13 and function as stops, preventing downward movement of the outer ends of the scale beams while the cam 85 prevents upward movement of the outer ends. This prevents the outer ends of the scale beams from dropping suddenly, when the bags are released, with a resulting jar or shock.

Referring to the auxiliary feed mechanisms, it will be noted that disposed in the aperture 77 of each boss 76 is a plurality of baffle plates 91. The baffle plates 91 are so arranged as to offer a minimum resistance to the material flowing through the apertures, but when the valve 78 is in a closed position and is to be opened, the baffles will support the major portion by the weight of the material contained in the tubes 73. This structure enables the valve to be easily opened, as the frictional resistance of the material resting upon the valve is lessened.

In the operation of the device, the operator threads the empty bags upon the lower ends of the funnels 32 as they pass by him, the carrier, of course, rotating continuously. As each bag passes beneath the drum 59, it receives a predetermined volume of material less than a desired total. Then as it passes successively beneath the series of feed mechanisms controlled by the valve 78, it will receive a plurality of auxiliary charges of material of less and less weight until the weight of material in the bag is brought to the desired total. This does not necessarily mean that each one of the auxiliary feed mechanisms will deliver a charge to each one of the bags, as the weight of material in the bag may reach the desired total before it registers with that particular auxiliary feed mechanism. When a bag has been properly filled, it is released from its funnel by means and in a manner hereinbefore described.

What I claim is new and desire to secure by Letters Patent in the United States, is:—

1. A bag filling machine comprising weighing mechanism, means for supplying to the weighing mechanism a predetermined volume of material of less weight than a desired total, and means controlled by the weighing mechanism for supplying to the weighing mechanism the remainder of the total weight desired, and means for conditioning the last mentioned means to deliver its total capacity or any fraction thereof.

2. A bag filling machine comprising weighing mechanism, means for supplying to the weighing mechanism a predetermined volume of material of less weight than a desired total, a series of feed mechanisms for supplying to the weighing mechanism the remainder of the total weight of material desired, each feed mechanism comprising means for delivering variable amounts of material, and means controlled by the weighing mechanism for controlling the feed mechanisms.

3. A bag filling machine comprising a traveling support, weighing mechanism carried by the support, means for supplying to the weighing mechanism a predetermined volume of material of less weight than a desired total, and a plurality of feed mechanisms arranged to come serially into operative relation with the weighing mechanism, each feed mechanism comprising means for delivering variable quantities of material, and means controlled by the weighing mechanism for actuating the feed mechanisms.

4. A bag filling machine comprising a traveling support, weighing mechanism carried by the support, means for supplying to the weighing mechanism a predetermined volume of material of less weight than a desired total, a series of feed devices, each feed device comprising means for discharging variable quantities of material to the weighing mechanism, and means moved by the raising and lowering of said weighing mechanism for actuating said feed devices to secure said variable discharge.

5. A bag filling machine comprising a weighing mechanism, a series of feed devices for supplying material to the weighing mechanism, a finger adapted to be raised and lowered by the weighing mechanism for successively actuating the feed devices, each feed device comprising means for delivering variable quantities of material in accordance with the height of said finger.

6. A bag filling machine comprising traveling weighing mechanism, means for delivering to the weighing mechanism a predetermined volume of material of less weight than a desired total, a series of valved feed mechanisms for successively feeding additional amounts of material to the weighing mechanism, and means controlled by the weighing mechanism for regulating amounts of material fed from each of the feed mechanisms.

7. A bag filling machine comprising a traveling support, weighing mechanism having a scale beam pivotally secured to the support to oscillate in a vertical plane, means for delivering to the weighing mechanism a predetermined volume of material less than a desired total, a series of feed mechanisms for successively delivering to the weighing mechanism additional amounts of material, each feed mechanism comprising a valve, and means carried by the scale beam for opening the valve variable amounts.

8. A bag filling machine comprising a traveling support, weighing mechanism having a scale beam pivotally secured to the support to oscillate in a vertical plane, means for delivering to the weighing mechanism a predetermined volume of material of less weight than a desired total, a series of feed mechanisms for successively delivering additional amounts of material to the weighing mechanism, each feed mechanism having a valve pivotally mounted to move in a substantially horizontal plane, means for yieldingly holding the valve in a closed position, and means carried by the scale beam for opening the valve variable amounts.

9. A bag filling machine comprising a rotatably mounted support, a scale beam pivotally secured to the support, means for detachably securing a bag to the scale beam, means for feeding into the bag a predetermined volume of material, a plurality of auxiliary feed mechanisms arranged successively in the path of the bag, each auxiliary feed mechanism comprising a valve, means for yieldingly holding the valve in a closed position, and means carried by the scale beam for engaging and opening each valve a distance controlled by the weight of material disposed in the bag.

10. A bag filling machine comprising a weighing mechanism, means for delivering to the weighing mechanism a predetermined volume of material of less weight than a desired total, a series of feed mechanisms for delivering additional quantities of material to the weighing mechanism, each feed mechanism comprising a valve, and means controlled by the weighing mechanism for holding each valve open a shorter length of time than the valve of the preceding feed mechanism.

11. A bag filling machine comprising weighing mechanism, means for delivering to the weighing mechanism a predetermined volume of material of less weight than a desired total, a series of feed mechanisms for successively delivering additional quantities of material to the weighing mechanisms, each feed mechanism comprising a valve, and means controlled by the weighing mechanism for opening each of said valves a distance less than the valve of the preceding feed mechanism is opened.

12. A bag filling machine comprising a weighing mechanism, a series of feed mechanisms for successively delivering quantities of material to the weighing mechanism, each feed mechanism comprising a valve, and means controlled by the weighing mechanism for holding each valve open a shorter length of time than the valve of the preceding feed mechanism.

13. A bag filling machine comprising a weighing mechanism, a series of feed mechanisms for successively delivering quantities of material to the weighing mechanism, each feed mechanism comprising a valve, and means controlled by the weighing mechanism for opening each of said valves a distance less than the distance the valve of the preceding feed mechanism is opened.

14. A method of filling a receptacle, carried by a weighing mechanism, with material comprising feeding into the receptacle a predetermined volume of material of less weight than a desired total, and of subsequently feeding into the receptacle a plurality of additional charges of material to bring the weight of the material in the receptacle to the desired total, and controlling the weight of said additional charges by the weight of the material previously fed into said receptacle.

15. A bag filling machine comprising a frame, a carrier rotatably journaled upon the frame, means for continually rotating the carrier, a plurality of scale beams pivotally secured to the carrier to oscillate in a vertical plane, means for detachably securing a bag to each of the scale beams comprising a pivotally mounted funnel, and a clamping device carried by the funnel, means comprising a rotatably journaled hollow drum for successively feeding a predetermined volume of material to each of said bags, means for rotating the drum in synchronism with the rotation of the carrier, a series of feed mechanisms for successively feeding additional quantities of material into each bag, each feed mechanism comprising a valve pivotally mounted to move in a substantially horizontal plane, means for holding the said valve in a closed position, means for opening each valve an amount inversely proportional to the weight of the material in the bag, and a means for automatically releasing the bag.

16. A bag filling machine comprising a rotatably mounted carrier, a plurality of scale beams pivotally secured to the carrier, means for detachably securing a bag to each of the scale beams comprising a pivotally mounted funnel, and a clamping device carried by the funnel, means comprising a rotatably journaled hollow drum for successively feeding a predetermined volume of material into each of said bags, a series of feed mechanisms for successively feeding additional quantities of material to each bag, each feed mechanism comprising a valve and means for holding said valve in a closed position, and means for opening each valve an amount inversely proportional to the weight of the material in the bag.

17. A bag filling machine comprising a rotatably mounted carrier, a plurality of scale beams pivotally secured to the carrier, means for detachably securing a bag to each of the scale beams, means for successively feeding a predetermined volume of material into each of said bags, a series of feed mechanisms for successively feeding additional quantities of material to each bag, each feed mechanism comprising a valve and means for opening said valve an amount inversely proportional to the weight of the material in the bag.

18. A bag filling machine comprising a rotatably journaled carrier, a plurality of weighing mechanisms mounted in the carrier, means for successively feeding to each weighing mechanism a predetermined volume of material, a series of feed mechanisms for successively feeding additional quantities of material to each weighing mechanism, and means for actuating each feed mechanism to deliver a quantity of material inversely proportional to the weight of the material in the weighing mechanism.

19. In a bag filling machine, a bag holder comprising a funnel having an external ledge over which a bag may be threaded, a pair of shafts rotatably journaled upon the funnel, the axes of the shafts being disposed parallel to one another, an arm rigidly secured to each shaft, a clamping lever pivotally secured to the free end of each arm, the clamping lever co-acting with said ledge to secure the bag to the funnel, a stop carried by each arm for limiting the angular displacement of its associated clamping lever in one direction, and means intermediate the shafts whereby angular displacement of one of the shafts in one direction will cause a like angular displacement of the other in the opposite direction.

20. In a bag filling machine, a bag holder comprising a funnel, a pair of shafts rotatably journaled upon the funnel, an arm rigidly secured to each shaft, a clamping lever pivotally secured to the free end of each arm, a stop carried by each arm for limiting the angular displacement of its associated clamping lever in one direction, and means intermediate the shafts whereby angular displacement of one of the shafts in one direction will cause a like angular displacement of the other in the opposite direction.

21. In a bag filling machine, a bag holder comprising a funnel, a shaft rotatably journaled upon the funnel, an arm rigidly secured to the shaft, a clamping lever pivotally secured to the free end of the arm, and a stop carried by the arm for limiting the angular displacement of the clamping lever in one direction.

22. In a bag filling machine, the combination with a bag holder comprising a funnel, a pair of shafts rotatably journaled upon the funnel, an arm rigidly secured to each shaft, a clamping lever pivotally secured to the free end of each arm, a stop carried by each arm for limiting the angular displacement of its associated clamping lever in one direction, and means intermediate the shafts whereby angular displacement of one of the shafts in one direction will cause a like angular displacement of the other in the opposite direction, and means comprising a cam for angularly displacing the shafts.

23. In a bag filling machine, the combination with a rotatably journaled carrier, of a scale beam pivotally secured to the carrier, the scale beam being arranged to oscillate radially relatively to the carrier, a chute pivotally secured to the outer end of the scale beam, means carried by the chute for detachably securing a bag to the chute comprising a pair of shafts rotatably journaled upon the chute, an arm rigidly secured to each shaft, a clamping lever pivotally secured to the free end of each arm, a stop carried by each arm for limiting the angular displacement of its associated clamping lever in one direction, and means intermediate the shafts whereby angular displacement of one of the shafts in one direction will cause a like angular displacement of the other in the opposite direction, and means comprising a cam for positioning the outer end of the scale beam, together with means for automatically releasing said bag holding means.

24. In a bag filling machine, the combination with a bag holder comprising a funnel, of a pair of shafts rotatably journaled upon the funnel, an arm rigidly secured to each shaft, a clamping lever pivotally secured to the free end of each arm, means for limiting the angular displacement of its associated clamping lever in one direction, and means intermediate the shafts whereby angular displacement of one of the shafts in one direction will cause a like angular displacement of the other in the opposite direction, and means comprising a cam for angularly displacing the shafts.

25. In a device of the class described the combination with a rotatably journaled carrier, of a scale beam pivotally secured to the carrier, means associated with the scale beam for detachably securing a receptacle thereto, means for automatically releasing the receptacle when the scale beam reaches a predetermined position relative to the rotary axis of the carrier, and means for locking the scale beam against angular displacement about its pivotal axis during the period the means for releasing the receptacle are actuated.

26. In a bag filling machine, the combination with a rotatably journaled carrier, of a scale beam pivotally secured to the carrier, bag holding means carried by the scale beam, means comprising a cam for releasing the bag holding means, and means comprising a second cam for positioning the bag holding means in operative relation relative to the first mentioned cam.

27. In a bag filling machine, the combination with a rotatably journaled carrier, of a scale beam pivotally secured to the carrier, means for detachably securing a bag to the carrier, comprising a chute carried by the scale beam, a plurality of shafts pivotally journaled upon the chute, an arm rigidly secured to each shaft, a clamping lever pivotally secured to each arm, the chute and clamping lever co-acting to frictionally secure a bag to the chute, means intermediate the shafts whereby angular displacement of one shaft in one direction will cause a like angularly displacement of the other in the opposite direction, a trip lever secured to one shaft for withdrawing the clamping lever from the bag, a roller rotatably journaled at the free end of the trip lever, a cam in the path of said roller for actuating said trip lever, and means comprising a second cam for locking the scale beam against angular displacement about its pivotal axis while the roller is in contact with the first mentioned cam.

28. In a bag filling machine, the combination with a hopper for holding the material with which the bags are to be filled, of means for positioning a bag beneath the hopper, and means intermediate the last mentioned means and the hopper for delivering a predetermined volume of material to the bag, the means comprising a hollow drum, and means disposed within the drum whereby air may flow into the drum when the drum is discharging a quantity of material into the bag.

29. A bag filling machine comprising weighing mechanism, means for supplying to the weighing mechanism a predetermined volume of material of less weight than a desired total, means adapted to supply to the weighing mechanism an additional amount of material, and means controlled by the weighing mechanism for determining whether all or a part of said additional amount shall be released.

30. A bag filling machine comprising weighing mechanism, means for supplying to the weighing mechanism a predetermined volume of material of less weight than a desired total, a container adapted to hold a lesser volume of material, a valve for permitting the discharge of said lesser volume of material to said weighing mechanism, and means controlled by the weighing mechanism for variably actuating said valve.

31. A bag filling machine comprising weighing mechanism, means for supplying to the weighing mechanism a predetermined volume of material of less weight than a desired total, means adapted to supply to the weighing mechanism an additional volume of material, and means controlled by the weighing mechanism for determining whether the whole or a part of said additional volume shall be supplied to the weighing mechanism.

32. A bag filling machine comprising weighing mechanism, means for supplying to the weighing mechanism a predetermined volume of material of less weight than a desired total, a series of feed mechanisms for supplying to the weighing mechanism additional volumes of material, and means controlled by the weighing mechanism for actuating said feed mechanisms to discharge different quantities therefrom.

33. In a bag filling machine, the combination with a hopper for holding the material with which the bags are to be filled, of means for rotating said hopper, an air conduit for venting air into the upper portion of said hopper when the latter is rotated to a discharging position, and a valve for closing said air conduit against ingress of material when said hopper is moved to receiving position.

34. In a bag filling machine, the combination of a funnel, a pair of clamping members adapted to hold the mouth of the bag over said funnel, and a spring member projecting from said funnel and adapted to hold a portion of the bag mouth away from said funnel for providing an air outlet from the upper portion of said bag outside of said funnel.

In witness whereof, I hereunto subscribe my name this 23rd day of September, 1921.

ROGERS M. WARWICK.